April 16, 1946.        J. N. LANDAU        2,398,540
DRAWN-IN COLLET CHUCK
Filed Oct. 19, 1943
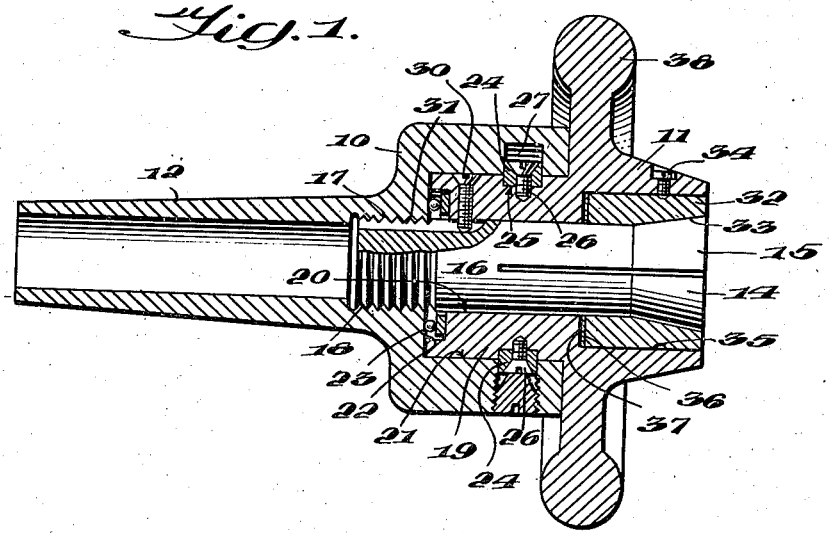
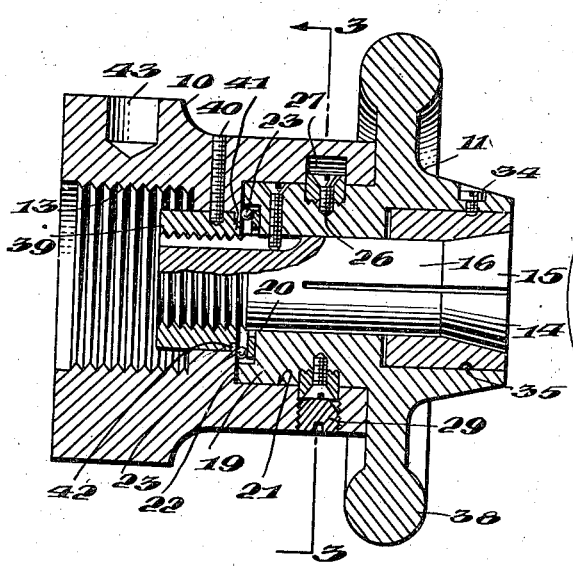
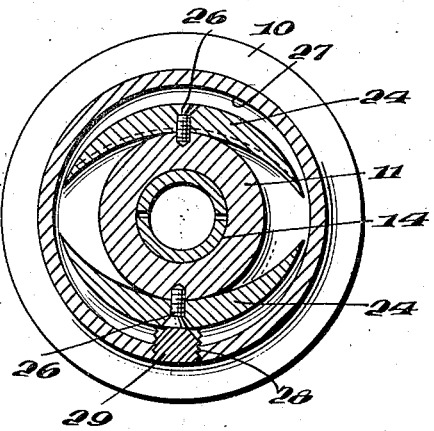
Inventor
JOSEPH N. LANDAU,
By Chas. M. Fankhouser
Attorney Patented Apr. 16, 1946

2,398,540

UNITED STATES PATENT OFFICE 2,398,540

DRAWN-IN COLLET CHUCK

Joseph N. Landau, New York, N. Y.

Application October 19, 1943, Serial No. 506,870

2 Claims. (Cl. 279—53)

This invention relates to chucks and more particularly to improvements in drawn-in chucks of the collet type for use in connection with the rotatable spindles and arbors of various machines. The chuck or collet forming the subject matter of the present invention is especially adapted for metal working machines wherein it is desired to provide a more efficient holding device for cylindrical metal stock and metal working tools and the like.

One important object of the present invention is to provide a novel form of drawn-in chuck which shall be more efficient in operation than those now in present day use.

Another object of the invention is to provide apparatus of the character designated which shall be more durable in construction and have a minimum number of moving parts.

A further object of the invention is to provide apparatus of the character designated which shall be readily adapted to a wider variety of metal working machines than similar devices now in use.

These and other objects of the invention will be more apparent from the following specification and drawing and more particularly set forth in the claims.

In the drawing:

Fig. 1 is a longitudinal sectional view of a chuck embodying the features of the present invention;

Fig. 2 is a longitudinal sectional view of a chuck embodying a modification of the apparatus shown in Fig. 1, and Fig. 3 is a sectional view on line 3—3 of Fig. 2.

Referring to Figs. 1 and 2 of the drawing there is shown a collet chuck embodying the several novel features of the present invention wherein the numeral 10 indicates a hollow supporting cylindrical body portion of the chuck and 11 indicates a cooperating hollow cylindrical nose or front body portion. The collet shown in Fig. 1 includes a rearwardly extending tapered body portion 12 which is adaptable for mounting in a rotatable machine socket, not shown, while that illustrated in Fig. 2 includes an interiorly threaded portion 13 for mounting on a threaded machine tool spindle. Whichever form of mounting construction is employed the important feature of the present construction is the particular arrangement for holding and operating the removable collet jaw member indicated by the numeral 14.

The collet jaw member 14 is of the conventional tubular spring jaw type for insertion into the nose portion 11. This collet includes forward outwardly tapered sectional spring elements 15—15 formed integrally with a rear body portion 16 having an external threaded portion 17. The threaded portion 17 is engaged by a corresponding threaded portion 18 in the hollow bore of chuck body 12.

The forward or nose portion of the device 11 is provided with an annular rearwardly extending tubular portion 19 which is provided with a hollow bore 20 for receiving and mounting the collet member 14. The exterior portion of the tubular member 19 is rotatably mounted within an enlarged annular bore 21 provided in the body member 10 and the rear end of the member 19 engages a shoulder 22 at the rear thereof by means of a thrust bearing indicated by the numeral 23.

The novel apparatus for holding and operating the collet jaw member 14 includes a pair of segmental holding collar members 24—24 shown more clearly in Fig. 3. These collar members are rigidly secured to and form a rigid integral part of the member 19 by means of an annular groove 25 and cooperating set screws indicated by the numerals 26—26. A corresponding and complementary groove 27 is cut in the inner periphery of the bore 20 in the member 10 for receiving the segmental collar members prior to assembly of the parts in their operative positions to form an integral wear collar. The outer periphery of groove 27 includes a threaded opening 28 for permitting insertion of the set screws 26—26 to securely hold the collar members. This opening is also employed as an internal lubrication opening for permitting lubrication of the interior of the chuck and is also closed by a threaded plug 29.

The collet member 14 is retained in sliding engagement with the member 19 by means of a set screw 30 threaded in the member 19 and having an end projecting into a longitudinally disposed channel 31 formed in the rear outer peripheral surface of the collet body 16.

Located in the interior forward end of the nose portion 11 is a rotatable annular bushing 32. This bushing has an annular tapered forward inner portion 33 for frictionally engaging the outer surface of the collet jaws 14 to force the same radially into engagement with the work being held. This bushing is held in place by means of a set screw 34 having its end projecting with an annular groove 35. The rearward thrust is taken up by an annular disc bearing member 36 engaging a shoulder portion 37 formed in the hollow bore of the rotatable nose section 11. An annular hand rim flange 38 is provided on the nose member 11 for operating the collet as hereinafter described.

Having thus described one embodiment of my invention, the operation is as follows. The collet 14 is screwed into the threaded portion 18 of the member 10 and the rotation of the hand rim 38 effects a relative rotation of the collet within the body 10 and thus causes the collet to move in or out relative to the taper portion 33 thus expanding or contracting the collet jaws as desired. By providing the internal holding collar segments 24—24 and the thrust bearing 23, the operation of the chuck is greatly facilitated by reducing friction and strain on the parts in the forward and rearward portions of the chuck body. This is a considerable advantage in increasing the efficiency of the chuck and facilitates the operation thereof because it provides an enclosed chuck with a minimum number of moving parts which are lubricated in more efficient manner.

Referring to the modification shown in Fig. 2, there is provided a removable interiorly threaded bushing 39 to receive the threaded end of the collet 14. This bushing 39 is rigidly held in place by a set screw 40 threaded into the rear of the body portion 10 and the bushing. The bushing is provided at its forward end by a reduced flanged portion 41 adapted to engage a corresponding flange portion 42 formed on the interior bore of the body 10 and adjacent to the inner end of the rotatable collet holding member 19. This construction provides a removable bushing for receiving different forms or sizes of threaded collets, and is inserted into and removed from the rear of body 10 by removing the set screw 40. The feature of inserting the bushing from the rear enables the bushing to be removed without dismantling the collet.

To facilitate the removal of the chuck 14 from the body 10 as shown in Fig. 2, the body 10 is also provided in the outer periphery with a hole 43 which may be of any suitable size or shape to receive a wrench element (not shown).

The chuck embodying the several improvements provides a device which may be adapted for a wide variety of uses and conditions of operation. The two-piece casing elements 10—11 house the moving parts and provide a more durable apparatus than those heretofore proposed and one which shall have a wide range of adjustability. The particular arrangement and construction of the parts also provides for more efficient lubrication of the several parts.

It will be obvious to those skilled in the art that various changes may be made in my device without departing from the spirit of invention, therefore I do not limit myself to what is shown in the drawing or described in the specification but only as disclosed in the appended claims.

What I claim is:

1. In a device of the character described, a rigid hollow cylindrical chuck having its forward portion enlarged to form a casing member, means at the rear of said casing for attaching the same to a support, a hand wheel having a hollow hub portion extending rearwardly and rotatably mounted in said rigid casing member, a collet jaw member located in said casing members, the rear of said collet threadedly engaging a portion of the interior of the rigid casing for causing longitudinal movement of the collet relative to the hand wheel and the forward end of the collet frictionally engaging the forward end of the hand wheel hub to effect gripping action of the collet jaws, a circumferential channel formed in the inner periphery of said rigid casing member, a corresponding channel formed on the outer periphery of the rotatable casing member and complementary to said first channel member, and a collar member located in said channels for retaining the parts in rotative relation while operating the collet jaw member.

2. In a device of the character described in claim 1, in which the collar member includes a plurality of segments, and means for rigidly securing the segments in the channel member.

JOSEPH N. LANDAU.